AIRBORNE TRANSOCEANIC RADIO RELAY SYSTEM

Filed July 7, 1949 2 SHEETS—SHEET 1

INVENTORS
CLARENCE W. HANSELL
& DONALD S. BOND
BY J. L. Whittaker
ATTORNEY

Jan. 27, 1953 C. W. HANSELL ET AL 2,627,021

AIRBORNE TRANSOCEANIC RADIO RELAY SYSTEM

Filed July 7, 1949 2 SHEETS—SHEET 2

INVENTORS
CLARENCE W. HANSELL
& DONALD S. BOND
BY J. L. Whittaker
ATTORNEY

Patented Jan. 27, 1953 2,627,021

UNITED STATES PATENT OFFICE 2,627,021

AIRBORNE TRANSOCEANIC RADIO RELAY SYSTEM

Clarence W. Hansell, Port Jefferson, N. Y., and Donald S. Bond, Princeton, N. J., assignors to Radio Corporation of America, a corporation of Delaware Application July 7, 1949, Serial No. 103,342

12 Claims. (Cl. 250—15)

The present invention relates to radio relay systems and particularly to a transoceanic wide-band radio-relay system in which aircraft carry the relay equipment.

One object of the invention is to provide a transoceanic radio-relay system having sufficient frequency band width to carry television picture signals.

A further object of the invention is to provide an improved method of and means for relaying over-water radio signals that cover a wide frequency band.

A still further object of the invention is to provide an improved method of and means for relaying radio signals.

In accordance with the present invention the radio relaying is done by means of radio-relay equipment on aircraft that fly from one terminal to the other terminal, the aircraft departing at regular intervals with sufficient frequency to permit radio transmission from aircraft to aircraft so as to form a complete circuit from terminal to terminal. The aircraft may return in a similar manner to provide a second series of airborne relay stations which may be put in use or held in reserve.

As will be explained in more detail hereinafter, it is desirable to employ ultra high frequency radio waves for relaying since wide frequency band transmission is desired. Since such radio waves do not provide reliable transmission beyond the horizon, the aircraft in the present system should fly at fairly high altitudes so as to reduce the number of planes required in the air between terminal points at any one time.

Figure 1:
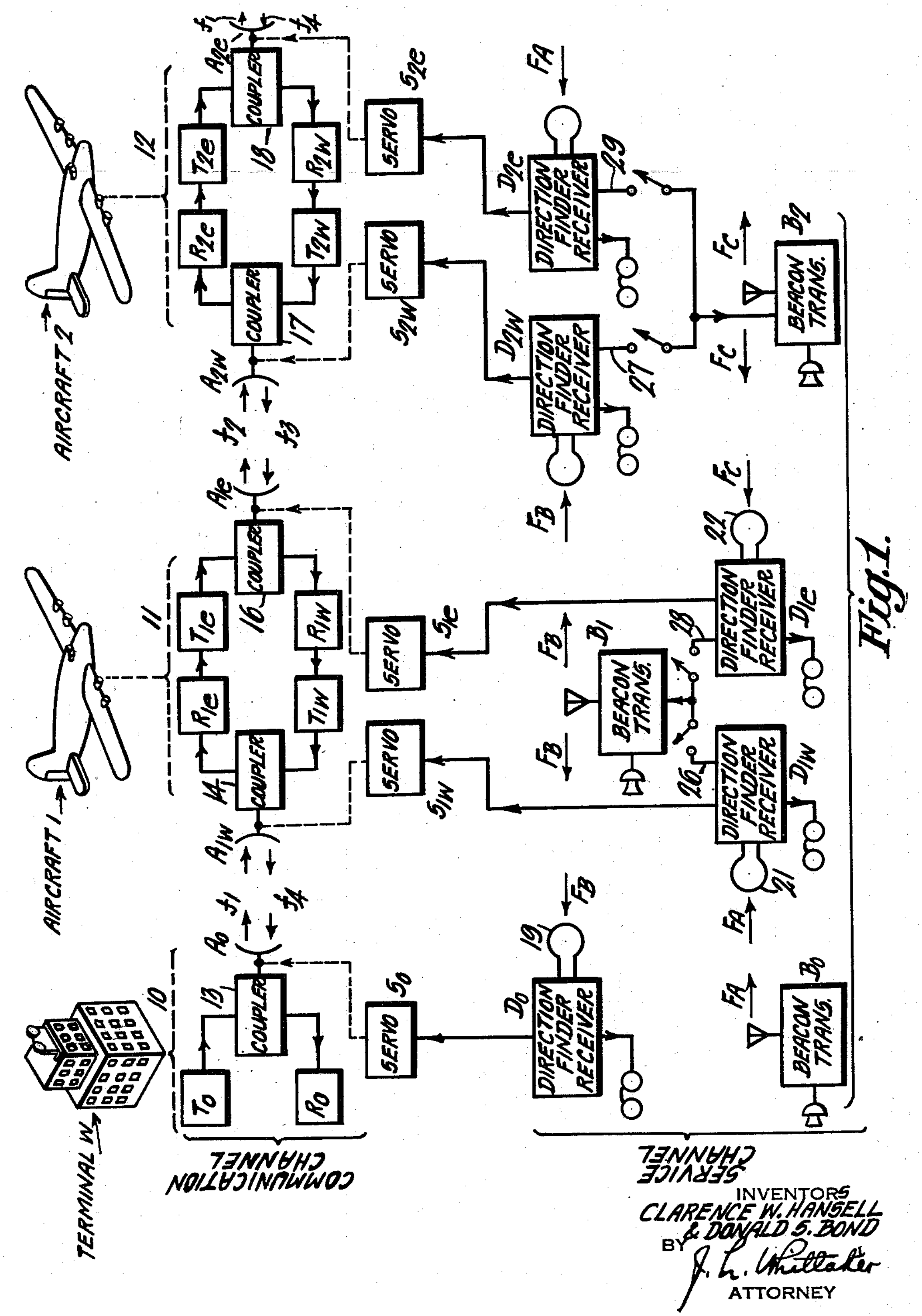
Figure 2:
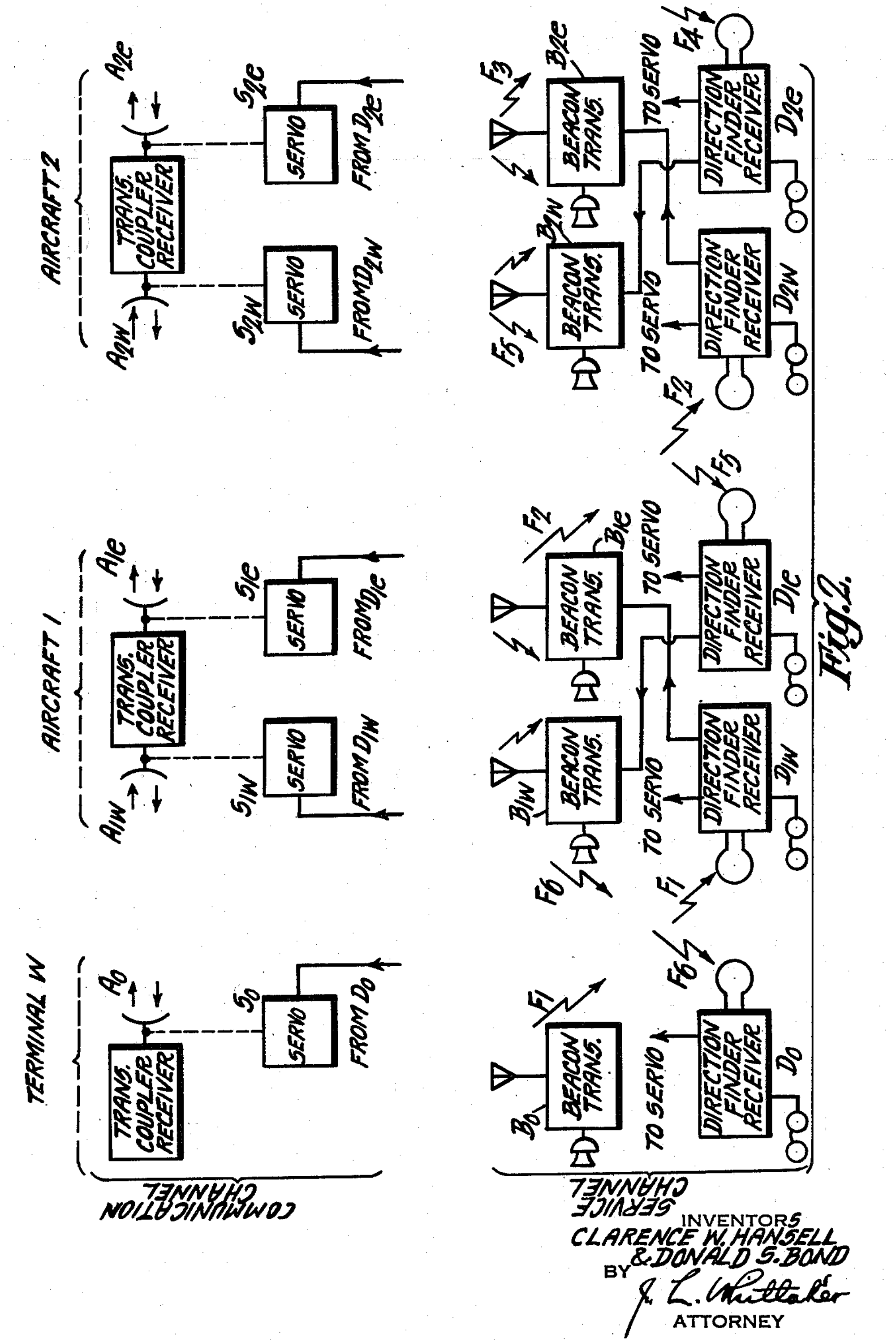

The invention will be better understood from the following description taken in connection with the accompanying drawing in which:

Figure 1 is a schematic and block diagram illustrating one embodiment of the invention, and Figure 2 is a block diagram illustrating another embodiment of the invention.

In the several figures of the drawing, similar parts are indicated by similar reference characters.

Before referring specifically to the drawing, one possible system will be described generally by way of example. It will be assumed that a relay circuit is to be established across the North Atlantic from New York to London. In this example, the system is set up to provide a minimum of two two-way radio-relay circuits, each five megacycles in intelligence band width. One of these two-way circuits may serve as the spare for the other. Scheduled airline planes act as the radio-relay stations. Each is equipped with two transmitters and two receivers operating in the microwave region of 4000 to 10,000 megacycles, for example, together with the necessary directive antennas to furnish the communication channel. An independent service channel operating at a lower frequency, 150 to 500 megacycles, for example, and with substantially non-directive emission is also provided. It includes a beacon transmitter and two direction finders on each craft. Installed also are servo controls for the microwave antennas for orientation in azimuth in accordance with the direction-finder bearings supplied from the service channel. Stabilization in elevation may be provided by suitable gyro control means, or it may be provided by servo controls in accordance with direction-finder bearings.

The airplanes are dispatched from the western terminal (New York) at regular intervals and along the same route so as to space the craft about 250 to 300 miles apart throughout their eastbound flight. Each flies at 10,000 to 15,000 feet or higher and thus remains within line of sight of both its predecessor and successor. Ground contact at the ends is shifted at regular intervals to each succeeding plane. A two-way wide-band circuit is thus established through the single-file series of eastbound planes. A duplicate and entirely separate two-way channel is obtained by use of the westbound flights.

Twelve to fourteen airborne relay stations are required in each circuit. The identity of individual ships is continually changing, of course. The circuits are in operation 24 hours a day.

The airplanes may be either passenger or cargo type, the essential requirement being that they should be reasonably matched in air speed. The system is most economical when the radio apparatus constitutes a small portion of the total pay load. The regular radio operator aboard the plane monitors the radio communication channel in flight.

Figure 1 shows, by way of example, the equipment that may be employed at the relay circuit terminals and on the aircraft linking the two terminals. To simplify the drawing, only one terminal is shown, indicated at W, and only the two aircraft 1 and 2 nearest the terminal W are shown.

The equipment shown below the terminal representation W is installed at the terminal W as indicated by the bracket 10. Similarly, the equipment shown below the aircraft 1 and that shown below the aircraft 2 are installed on the aircraft 1 and 2, respectively, as indicated by the brackets 11 and 12.

The system comprises both a communication channel and a service channel as indicated on the drawing. The service channel is primarily for maintaining the directive antennas of each relay station in the communication channel pointed toward the adjacent relay station. The service channel may also be used for service messages between adjacent relay stations, for example. The service channel will be a comparatively low power narrow frequency band channel and it may be expected that the signal-to-noise ratio will be rather low.

Referring to the communication channel, the equipment at the west terminal W comprises a transmitter $T_0$, a receiver $R_0$, and a coupler 13 and a directive antenna $A_0$. Similar equipment is provided at the east terminal which is not shown.

Transmitter $T_0$ may be in any one of various more or less conventional designs employing amplitude, phase, frequency or single sideband modulation. In the present example, it will be assumed that it includes a carrier wave source supplying a carrier of frequency 6000 megacycles (indicated by $f_1$) which is modulated by a television signal of about 5 megacycles band width. The carrier of frequency $f_1$, may, instead, be modulated by subcarriers which, in turn, are modulated by speech or the like as is well understood in the art. A system employing subcarriers is described, for example, in Patent No. 2,358,382, issued September 19, 1944 to W. L. Carlson.

The receiver $R_0$ is for receiving signal transmitted from the other terminal, the east terminal in this example. If the transmission is that of a television picture the receiver $R_0$ will preferably include a television receiver, at least for monitoring purposes. In practice, video frequency output power from receiver $R_0$ would probably be delivered to a distribution network and carried to television transmitters for broadcasting the picture. It may also be delivered to theaters for showing to audiences. In other instances the television channel may be occupied by multiplexed communication channels to provide telephone, telegraph, facsimile, business machine and other types of service.

In the example illustrated, the carrier frequencies, of waves transmitted and received by the antennas, $f_1$ and $f_2$ are employed for transmission west to east while carrier frequencies $f_3$ and $f_4$ are employed for transmission east to west. The frequencies $f_1$, $f_2$, $f_3$ and $f_4$ may be, for example, 6000 mc., 6050 mc., 6100 mc. and 6150 mc., respectively.

The use of two different frequencies in a given direction of transmission is to avoid singing, or uncontrolled oscillation, of the repeaters as is well known in the art. The use of different frequencies in the west and east channels is to provide channel separation. It will be apparent that the coupler 13, as well as the other couplers in the communication channel, may comprise frequency selective filters and perhaps balancing networks in accordance with conventional practice to prevent signal power from transmitter $T_0$ getting into receiver $R_0$, and to prevent received signal power on carrier $f_4$ from passing into the circuit of transmitter $T_0$.

The couplers may be of the directional coupler type, instead of the filter type. For example, the couplers may comprise the well known magic-T. Or the couplers may comprise both filters and directional couplers or balancing arrangements.

Signal on carrier $f_1$ is passed from transmitter $T_0$ through coupler 13 to the directive antenna $A_0$ and radiated to aircraft 1 where it is picked up by a directive antenna $A_{1w}$.

The communication channel relay equipment on the aircraft 1 comprises the antenna $A_{1w}$, a coupler 14, a radio repeater which may be divided into a receiver $R_{1e}$ and a transmitter $T_{1e}$ through which signal passes west to east, a coupler 16 and a directive antenna $A_{1e}$. This relay equipment also comprises a receiver $R_{1w}$ and a transmitter $T_{1w}$ through which signal passes east to west.

The signal on carrier $f_1$ passes through coupler 14 to the receiver $R_{1e}$ where it is demodulated, for example, and applied to the transmitter $T_{1e}$ to modulate a carrier wave of frequency $f_2$ supplied from a carrier source in transmitter $T_{1e}$. The signal on the new carrier $f_2$ then passes through the coupler 16 and is radiated from antenna $A_{1e}$ to the antenna $A_{2w}$ of the relay equipment on aircraft 2.

Instead of demodulating at $R_{1e}$ and remodulating at $T_{1e}$, other known methods for putting the signal on the new carrier $f_2$ may be employed. For example, one may heterodyne down to an intermediate frequency and then beat up to the new radio frequency $f_2$. This last method generally will be preferred because it is an aid to keeping low distortion of the useful modulations.

The communication channel relay on aircraft 1 also comprises a radio repeater, which may comprise the receiver $R_{1w}$ and the transmitter $T_{1w}$ for east-to-west transmission which may be designed the same as the west-to-east units $R_{1e}$ and $T_{1e}$. In the present example, the east-to-west signal picked up by antenna $A_{1e}$ is a carrier of frequency $f_3$ and is passed through coupler 16 to receiver $R_{1w}$. The video frequency signal or other demodulated signal is then applied to transmitter $T_{1w}$ where it modulates a carrier wave of frequency $f_4$ which is passed through coupler 14 and radiated from antenna $A_{1w}$ toward the antenna $A_0$ of the terminal station.

In this case also it generally will be preferred to heterodyne to an intermediate frequency in receiver $R_{1w}$ and to heterodyne back up again in transmitter $T_{1w}$, to avoid distortions inherent in demodulation and remodulation of signals.

The communication channel relay equipment on the other aircraft of the relay chain are the same as on aircraft 1 except for adjustments for operating at the frequencies assigned to the particular relay station.

The relay equipment on aircraft 2, for example, comprises the directive antenna $A_{2w}$, a coupler 17, a receiver $R_{2e}$ and a transmitter $T_{2e}$ in the west-to-east channel, a coupler 18 and a directive antenna $A_{2e}$. It also comprises a receiver $R_{2w}$ and a transmitter $T_{2w}$ in the east-to-west channel.

It will be seen the transmitter $T_{2e}$ is adjusted to supply signal to antenna $A_{2e}$ at the carrier frequency $f_1$ and that the transmitter $T_{2w}$ is adjusted to supply signal to antenna $A_{2w}$ at the carrier frequency $f_3$.

Since aircraft 1, as it moves away from terminal W will be replaced in the chain by a later leaving aircraft set up to receive $f_2$ instead of $f_1$, the terminal W must include means to switch the frequency of transmitter $T_0$ to either $f_1$ or $f_2$ frequencies at the necessary intervals, or alternatively and preferably, transmitter $T_0$ may be either one of two transmitters operable either alternately or simultaneously for short periods, to facilitate adding airplane stations to the chain. Similarly there must be means to switch receiver frequencies, or preferably to operate two receivers simultaneously at the receiving terminal to facilitate dropping airplane stations out of the chain.

*The service channel*

The main function of the service channel is to point each directive antenna of the communication channel in the proper direction for efficient transmission and reception. For example, antenna $A_0$ of the terminal W should be pointed toward the aircraft 1, and the antenna $A_{1W}$ of aircraft 1 should be pointed toward terminal W. This function of the service channel is very important because each of the directive microwave antennas has such a narrow radiation beam that it must be oriented fairly accurately.

Figure 1 illustrates one of the ways in which such antenna orientation may be accomplished. Aircraft 1 carries a radio beacon transmitter $B_1$ which radiates a radio carrier signal of frequency $F_B$ from a non-directive antenna so that the beacon signal may be picked up from any direction. At the terminal W there is a self-orienting or automatic direction finder receiver $D_0$ provided with a loop antenna 19. The loop 19 picks up signal from beacon $B_1$ and automatically turns toward beacon $B_1$, that is, toward aircraft 1. At the same time, the antenna $A_0$ is turned toward aircraft 1 by means of a suitable servo system $S_0$. In its simplest form the servomechanism may comprise simply mounting antennas 19 and $A_0$ on one mount and antennas 21 and $A_{1W}$ on one mount, etc. In other cases a more complicated control servo system, known in the art, may be used.

In a similar fashion the antenna $A_{1W}$ of aircraft 1 is turned toward the terminal W. This is accomplished by means of a radio beacon $B_0$ located at the terminal W and similar to beacon $B_1$ but operating on a different frequency $F_A$. At aircraft 1 the loop antenna 21 of an automatic direction finder $D_{1W}$ automatically turns towards the beacon $B_0$, i. e. toward terminal W, and simultaneously turns the antenna $A_{1W}$ of aircraft 1 toward terminal W, a suitable servo $S_{1W}$ being employed to turn antenna $A_{1W}$ under the control of loop 21.

Similarly, the antenna $A_{1e}$ of aircraft 1 is caused always to point toward aircraft 2, the antenna $A_{2W}$ of aircraft 2 is caused always to point toward aircraft 1, the antenna $A_{2e}$ of aircraft 2 is caused always to point toward aircraft 3 (not shown), etc.

It will be seen that each aircraft carries a beacon transmitter and two automatic direction finder receivers. The east terminal (not shown) is provided with a beacon transmitter and one automatic direction finder receiver.

Aircraft 2 carries the beacon $B_2$ which transmits a carrier wave of frequency $F_C$. At the aircraft 1 the loop antenna 22 of direction finder $D_{1e}$ turns toward beacon $B_2$ of aircraft 2 so that, by means of a servo $S_{1e}$, the antenna $A_{1e}$ of aircraft 1 is turned toward aircraft 2.

The action of the direction finders $D_{2W}$ and $D_{2e}$ on aircraft 2 in controlling the direction of antennas $A_{2W}$ and $A_{2e}$, respectively, by way of servos $S_{2W}$ and $S_{2e}$ will be apparent from the foregoing description.

As indicated in Figure 1, at three successive relay stations the beacon carrier frequencies are $F_A$, $F_B$ and $F_C$. Thus, a direction finder receiver which may be searching in all directions cannot pick up a signal that will turn it in the wrong direction. The frequencies $F_A$, $F_B$, and $F_C$ may be 300 mc., 305 mc. and 310 mc., for example.

However, it should be noted that, in order that airplanes may be added at intervals at one end of the chain, and taken out at intervals at the other end, the terminal stations must provide for duplication and switching of beacon transmitters and receivers, or for periodic frequency switching, on account of the periodically changing operating frequencies.

The service channel may also be used for communication between terminals and between airborne relay stations by voice modulating the beacon transmitters. This is indicated on the drawing by showing microphones at the beacons and headphones at the direction-finder receivers.

Except for service communication between adjacent relay stations only, it is necessary that the voice service signal or the like be relayed through the relay stations. For west-to-east communication, it is only required that the audio output of receiver $D_{1W}$ of aircraft 1 be applied through a connection 26 to the modulator of beacon $B_1$, that the audio output of receiver $D_{2W}$ of aircraft 2 be applied through a connection 27 to the modulator of beacon $B_2$, etc.

Similarly, for east-to-west service communication the audio output of receiver $D_{1e}$ of aircraft 1 is applied to beacon $B_1$ through a connection 28, the audio output of receiver $D_{2e}$ of aircraft 2 is applied to beacon $B_2$, through a connection 29, etc.

Switches are provided in the connections 26, 27, 28, 29, etc. to connect through for either west-to-east or east-to-west service communication as desired. Communication in the reverse direction may be obtained in this case by connection around a loop comprising airplanes flying in both directions and making up two parallel relay chains.

Figure 2 of the drawing shows a system similar to that shown in Figure 1 except that the service channel comprises two radio beacon transmitters on each aircraft of the relay chain. At aircrafts 1 and 2 these beacons are $B_{1W}$, $B_{1e}$ and $B_{2W}$, $B_{2e}$, respectively. This arrangement permits simultaneous two-way transmission of service information or the like between the two terminal stations.

As indicated in Figure 2, a total of six carrier frequencies are employed, three frequencies in each direction. These frequencies are represented by reference characters $F_1$, $F_2$, $F_3$, $F_4$, $F_5$, and $F_6$. The six frequencies may be, for example, 300 mc., 305 mc., 310 mc., 315 mc., 320 mc. and 325 mc.

It will be understood that the microwave antennas may be oriented by a combination of gyro and direction finder control. For example, they may be oriented in azimuth by means of a gyro system to which corrections are applied by the direction finders.

Self-orienting or automatic radio direction finders are well known in the art. A direction finder of this type is described, for example, in Patent No. 2,314,029, issued March 16, 1943 to D. S. Bond and W. L. Carlson.

Faults in the service channel may be located as described in application Serial No. 696,566, filed September 12, 1946 in the name of Donald S. Bond et al., now Pat. No. 2,514,367 issued July 11, 1950. For example, it will be evident that in the system shown in Figure 2, a carrier frequency modulated by an audio-frequency tone may be transmitted from beacon $B_0$ at terminal W and the tone transmitted back from any one of the relay stations by applying the tone to the beacon transmitting to the west terminal. For instance, at aircraft 1 the receiver $D_{1W}$ may have its audio output applied to beacon $B_{1W}$ instead of to beacon $B_{1e}$ by means of a switch (not shown). If the tone is received satisfactorily at the terminal receiver $D_0$ it means that this particular loop of the circuit is satisfactory. Thus the circuit may be tested through successive relay stations to locate a circuit fault.

We claim as our invention:

1. Radio relay apparatus and antenna directional control apparatus therefor, said relay and control apparatus to be carried by an aircraft to function as one relay station of a chain of relay stations, said radio relay apparatus comprising a radio receiver and a directional receiving antenna therefor and further comprising a radio transmitter and a directional transmitting antenna therefor, said control apparatus comprising a radio beacon transmitter and a non-directional antenna therefor for radiating a radio wave therefrom, said control apparatus further comprising an automatic direction finder and means coupling said finder to said directive receiving antenna to control its direction and further comprising a second automatic direction finder and means coupling said second finder to said directive transmitting antenna to control its direction.

2. Radio relay apparatus and antenna directional control apparatus therefor, said relay and control apparatus to be carried by an aircraft to function as one relay station of a chain of relay stations, said radio relay apparatus comprising a radio receiver and a directional receiving antenna therefor and further comprising a radio transmitter and a directional transmitting antenna therefor, said control apparatus comprising two radio beacon transmitters operating at different carrier frequencies, each beacon having a non-directional antenna for radiating a radio wave therefrom, said control apparatus further comprising an automatic direction finder tuned to one of the beacons of one adjacent aircraft of said chain and means coupling said finder to said directive receiving antenna to control its direction and keep it pointed toward said one adjacent aircraft and further comprising a second automatic direction finder tuned to one of the beacons of the other adjacent aircraft of said chain and means coupling said second finder to said directive transmitting antenna to control its direction and keep it pointed toward said other adjacent aircraft.

3. Radio relay apparatus and antenna directional control apparatus therefor, said relay and control apparatus to be carried by an aircraft to function as one relay station of a chain of relay stations, said radio relay apparatus comprising a radio receiver and a directional receiving antenna therefor and further comprising a radio transmitter and a directional transmitting antenna therefor, said control apparatus comprising a radio beacon transmitter and a non-directional antenna therefor for radiating a radio wave therefrom, said control apparatus further comprising an automatic direction finder and means coupling said finder to said directive receiving antenna to control its direction and further comprising a second automatic direction finder and means coupling said second finder to said directive transmitting antenna to control its direction, and means for supplying the signal output of at least one of said direction finders to said beacon transmitter for modulating the beacon carrier wave whereby said control apparatus may be utilized for communication or testing.

4. Radio relay apparatus and antenna directional control apparatus therefor, said relay and control apparatus to be carried by an aircraft to function as one relay station of a chain of relay stations, said radio relay apparatus comprising a radio receiver and a directional receiving antenna therefor and further comprising a radio transmitter and a directional transmitting antenna therefor, said control apparatus comprising two radio beacon transmitters each having a non-directional antenna for radiating radio waves therefrom, said beacons operating at different carrier frequencies, said control apparatus further comprising an automatic direction finder and means coupling said finder to said directive receiving antenna to control its direction and further comprising a second automatic direction finder and means coupling said second finder to said directive transmitting antenna to control its direction, means for supplying the signal output of one of said direction finders to one of said beacon transmitters for modulating its carrier wave, and means for supplying the signal output of the other of said direction finders to the other of said beacon transmitters for modulating its carrier wave whereby said control apparatus may be utilized for two-way communication or testing.

5. A communication system comprising a plurality of airborne radio relay stations, each station comprising a radio relay having a directive receiving antenna and a directive transmitting antenna, each station further comprising a radio beacon transmitter that transmits a radio wave of frequency $F_1$ from a non-directive antenna, each station further comprising a pair of automatic direction finders, one of said direction finders being tuned to a beacon radio wave of frequency $F_2$ which is transmitted from the same relay station from which said directive receiving antenna is receiving signal, means whereby said one direction finder controls the direction of said directive receiving antenna to make it point toward said last-mentioned relay station, the other of said direction finders being tuned to a beacon radio wave of frequency $F_3$ which is transmitted from the same relay station to which said directive transmitting antenna is radiating signal, and means whereby said other direction finder controls the direction of said directive transmitting antenna to make it point toward said relay station to which said transmitting antenna is radiating signal.

6. A communication system comprising a plurality of airborne radio relay stations, each station comprising a wide band microwave radio relay having a sharply directive receiving antenna and a sharply directive transmitting antenna, each station further comprising a radio beacon transmitter that transmits a radio wave of comparatively low carrier frequency $F_1$ from a non-directive antenna, each station further comprising a pair of automatic direction finders, one of said direction finders being tuned to a beacon radio wave of comparatively low carrier frequency $F_2$ which is transmitted from the same relay station from which said directive receiving antenna is receiving signal, means whereby said one direction finder orients said directive receiving antenna to make it point toward said last-mentioned relay station, the other of said direction finders being tuned to a beacon radio wave of comparatively low carrier frequency $F_3$ which is transmitted from the same relay station to which said directive transmitting antenna is radiating signal, and means whereby said other direction finder orients said directive transmitting antenna to make it point toward said relay station to which said transmitting antenna is radiating signal.

7. Radio relay apparatus and antenna directional control apparatus therefor, said relay and control apparatus to be carried by an aircraft to function as one relay station of a chain of relay stations, said radio relay apparatus comprising a radio receiver and a directional receiving antenna therefor and further comprising a radio transmitter and a directional transmitting antenna therefor, said control apparatus comprising two radio beacon transmitters, each operating at a different carrier wave frequency, each of said beacon transmitters having a non-directional antenna for radiating a carrier wave therefrom, said control apparatus further comprising an automatic direction finder and means coupling said finder to said directive receiving antenna to control its direction and further comprising a second automatic direction finder and means coupling said second finder to said directive transmitting antenna to control its direction.

8. A communication system comprising a chain of airborne radio relay stations, each station comprising a radio relay having a directive receiving antenna and a directive transmitting antenna, each station further comprising two radio beacon transmitters that transmit radio waves of frequencies $F_B$ and $F_D$, respectively, from non-directive antennas, each station further comprising a pair of automatic direction finders, one of said direction finders being tuned to a beacon radio wave of frequency $F_A$ which is transmitted from the same relay station from which said directive receiving antenna is receiving signal, means whereby said one direction finder controls the direction of said directive receiving antenna to make it point toward said last-mentioned relay station, the other of said direction finders being tuned to a beacon radio wave of frequency $F_C$ which is transmitted from the same relay station to which said directive transmitting antenna is radiating signal, means whereby said other direction finder controls the direction of said directive transmitting antenna to make it point toward said relay station to which said transmitting antenna is radiating signal, means for applying signal from said one direction finder to one of said two beacons to modulate its carrier wave, and means for applying signal from said other direction finder to the other of said two beacons to modulate its carrier wave.

9. Radio relay apparatus and antenna directional control apparatus therefor, said relay and control apparatus to be carried by an aircraft to function as one relay station of a chain of relay stations, said radio relay apparatus comprising a radio receiver and a directional receiving antenna therefor and further comprising a radio transmitter and a directional transmitting antenna therefor, said control apparatus comprising a radio beacon transmitter and a non-directional antenna therefor for radiating a radio wave therefrom, said control apparatus further comprising an automatic direction finder receiver and servomechanism coupling said finder receiver to said directive receiving antenna to control its direction and further comprising a second automatic direction finder receiver and servomechanism coupling said second finder receiver to said directive transmitting antenna to control its direction.

10. Radio relay apparatus and antenna directional control apparatus for each aircraft of a system wherein a plurality of radio-relay carrying aircraft are to relay signals from one aircraft to another, comprising a first directive antenna, a first automatic direction finder on said aircraft, said direction finder including means for orienting said directive antenna in response to a signal from a first remote antenna, a second directive antenna, a second direction finder including means for controlling the direction of said second directive antenna in response to a signal from a second remote antenna, means for modulating signals impressed upon said first directive antenna in accordance with signals derived from said second directive antenna, and means for modulating signals impressed on said second directive antenna in accordance with signals derived from said first directive antenna.

11. Radio relay apparatus and antenna directional control apparatus therefor, said relay and control apparatus to be carried by an aircraft to function as one relay station of a chain of relay stations, said radio relay apparatus comprising a radio receiver and a directional receiving antenna therefor and further comprising a radio transmitter and a directional transmitting antenna therefor, said control apparatus comprising a radio beacon transmitter and an antenna therefor for radiating a radio wave therefrom, said control apparatus further comprising an automatic direction finder and means coupling said finder to said directive receiving antenna to control its direction and further comprising a second automatic direction finder and means coupling said second finder to said directive transmitting antenna to control its direction.

12. In a radio relay system, radio communication apparatus and antenna directional control apparatus therefor, said communication and control apparatus being located in one station in a chain having aircraft relay stations, said communication apparatus comprising a radio receiver and a radio transmitter both coupled to directional antenna means, said control apparatus comprising a radio beacon transmitter for controlling apparatus at an adjacent aircraft relay station in line of sight of said one station and an antenna therefor for radiating a radio wave therefrom of a frequency appreciably removed from the frequency of the wave radiated by said communication radio transmitter, means for modulating the wave radiated from said beacon transmitter to provide a service channel for the relay stations in said system, said control apparatus further comprising automatic direction finder means and means coupling said finder to and controlling said directional antenna means.

CLARENCE W. HANSELL.
DONALD S. BOND.

REFERENCES CITED

The following references are of record in the file of this patent:

UNITED STATES PATENTS

| Number | Name | Date |
|---|---|---|
| 1,624,966 | Morris | Apr. 19, 1927 |
| 2,152,239 | Schussler | Mar. 28, 1939 |
| 2,234,244 | Gossel | Mar. 11, 1941 |
| 2,257,319 | Williams | Sept. 30, 1941 |
| 2,369,622 | Toulon | Feb. 13, 1945 |
| 2,379,362 | Lear | June 26, 1945 |
| 2,542,823 | Lyle | Feb. 20, 1951 |

OTHER REFERENCES

"New Radio Concept Would End Chains," New York Times, page 17, August 10, 1945.